(12) United States Patent
Qiu et al.

(10) Patent No.: US 10,419,183 B2
(45) Date of Patent: Sep. 17, 2019

(54) METHOD AND APPARATUS FOR SENDING AND RECEIVING SIGNAL

(71) Applicant: HUAWEI TECHNOLOGIES CO., LTD., Shenzhen, Guangdong (CN)

(72) Inventors: Jing Qiu, Chengdu (CN); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 15/333,448

(22) Filed: Oct. 25, 2016

(65) Prior Publication Data

US 2017/0041107 A1 Feb. 9, 2017

Related U.S. Application Data

(63) Continuation of application No. PCT/CN2014/076298, filed on Apr. 25, 2014.

(51) Int. Cl.
*H04L 5/00* (2006.01)
*H04B 7/04* (2017.01)
(Continued)

(52) U.S. Cl.
CPC ............. *H04L 5/005* (2013.01); *H04B 7/046* (2013.01); *H04B 7/0452* (2013.01);
(Continued)

(58) Field of Classification Search
None
See application file for complete search history.

(56) References Cited

U.S. PATENT DOCUMENTS

2008/0232494 A1* 9/2008 Pan ...................... H04B 7/0426
375/260
2009/0262846 A1 10/2009 Ko et al.
(Continued)

FOREIGN PATENT DOCUMENTS

CN 101569127 A 10/2009
CN 101572682 A 11/2009
(Continued)

OTHER PUBLICATIONS

An Liu et al., Hierarchical interference mitigation for large MIMO cellular networks, IEEE transaction on signal processing, vol. 62, No. 18, Sep. 15, 2014. pp. 4786-4797, total: 12 pages.
(Continued)

*Primary Examiner* — Saba Tsegaye
(74) *Attorney, Agent, or Firm* — Fish & Richardson P.C.

(57) ABSTRACT

Embodiments of the present invention provide a method and apparatus for sending and receiving a signal, and relate to the field of wireless communication, where a quantity of pilots does not increase with increasing paired data streams of an MU-MIMO system, and overheads of the pilots are fixed. The method includes: determining, by a transmitter, a transmitting precoding vector of a primary pilot signal of a first receiver and an estimated receiving filtering vector; determining a transmitting precoding vector of a secondary pilot signal of the first receiver; determining a to-be-sent primary pilot signal, to-be-sent user data of the first receiver, and a to-be-sent secondary pilot signal; and sending the first receiver the to-be-sent primary pilot signal, the to-be-sent user data of the first receiver, and the to-be-sent secondary pilot signal.

20 Claims, 5 Drawing Sheets

(51) Int. Cl.
    *H04L 25/02* (2006.01)
    *H04L 1/06* (2006.01)
    *H04B 7/0452* (2017.01)
    *H04B 7/0456* (2017.01)
    *H04B 7/06* (2006.01)
    *H04B 7/08* (2006.01)

(52) U.S. Cl.
    CPC .......... *H04B 7/0615* (2013.01); *H04L 1/06* (2013.01); *H04L 25/0204* (2013.01); *H04L 25/0226* (2013.01); *H04L 25/0228* (2013.01); *H04B 7/0862* (2013.01); *H04L 5/0051* (2013.01)

(56) References Cited

U.S. PATENT DOCUMENTS

| | | |
|---|---|---|
| 2010/0009718 A1 | 1/2010 | Higuchi et al. |
| 2010/0246515 A1* | 9/2010 | Couse ............ G06Q 10/109 370/352 |
| 2012/0082192 A1 | 4/2012 | Pelletier et al. |
| 2012/0093261 A1 | 4/2012 | Kim et al. |
| 2012/0182964 A1 | 7/2012 | Gao et al. |
| 2012/0201319 A1 | 8/2012 | Asplund et al. |
| 2012/0236909 A1 | 9/2012 | Ma et al. |
| 2013/0215872 A1 | 8/2013 | Johansson et al. |
| 2014/0286298 A1 | 9/2014 | Yoshimoto et al. |

FOREIGN PATENT DOCUMENTS

| | | |
|---|---|---|
| CN | 101984571 A | 3/2011 |
| CN | 102075303 A | 5/2011 |
| CN | 102300299 A | 12/2011 |
| CN | 102752837 A | 10/2012 |
| CN | 103081375 A | 5/2013 |
| EP | 2068479 A1 | 6/2009 |
| JP | 2011518516 A | 6/2011 |
| JP | 2013038694 | 2/2013 |
| KR | 20090060439 A | 6/2009 |
| RU | 2009114329 A | 11/2010 |
| WO | 2011012043 A1 | 2/2011 |
| WO | 2012044967 A1 | 4/2012 |
| WO | 2013073557 A1 | 5/2013 |

OTHER PUBLICATIONS

Chinese Office Action issued in Chinese Application No. 201480078081.5 dated Nov. 1, 2018, 9 pages.

* cited by examiner

METHOD AND APPARATUS FOR SENDING AND RECEIVING SIGNAL

CROSS-REFERENCE TO RELATED APPLICATIONS

This application is a continuation of International Application No. PCT/CN2014/076298, filed on Apr. 25, 2014, the disclosure of which is hereby incorporated by reference in its entirety.

TECHNICAL FIELD

The present invention relates to the field of wireless communications, and in particular, to a method and apparatus for sending and receiving a signal.

BACKGROUND

With the rapid development of communication technologies, high speed, large capacity, and wide coverage have become main features of a modern communications system. Currently, an MU MIMO (Multi-User MIMO) technology has become one of core technologies of mainstream wireless communications standards such as LTE (Long Term Evolution) or LTE-A (LTE-Advanced).

In an MU MIMO system, spatial multiplexing of data streams of multiple users is implemented by using a precoding technology, which may greatly improve spectral efficiency and a capacity of the system. Design of a pilot provides guidance for a receiver to try its best to obtain a channel that has relatively low inter-user interference, so as to correctly receive data. In an LTE standard, multiple pilots used in the MU MIMO system are orthogonal to each other in a code division manner or in a code division and frequency division manner, so that the receiver can obtain "clean" channel information no matter whether interference exists between multiple streams in the system. Currently, eight orthogonal pilots defined in the standard can support concurrent transmission of a maximum of eight data streams, and overheads of the eight pilots have occupied 14.3% of all transmission resources.

However, as paired data streams of the MU MIMO system increase, a quantity of orthogonal pilots that are required by the system will also increase accordingly, and an overhead of the increased pilots will occupy transmission resources of useful data.

SUMMARY

Embodiments of the present invention provide a method and apparatus for sending and receiving a signal, where pilot signals are made spatially orthogonal to each other by using a precoding technology, a quantity of pilots does not increase with increasing paired data streams of an MU-MIMO system, and overheads of the pilots are fixed.

To achieve the foregoing purpose, the following technical solutions are used in the embodiments of the present invention.

According to a first aspect, an embodiment of the present invention provides a transmitter, applied in a multi-user multiple-input multiple-output MU MIMO system, where the MU MIMO system includes one transmitter that communicates with at least two receivers, and the transmitter includes:

a determining unit, configured to determine a transmitting precoding vector of a primary pilot signal of a first receiver according to first spatial channel information, and determine an estimated receiving filtering vector according to the transmitting precoding vector of the primary pilot signal and second spatial channel information; configured to determine a transmitting precoding vector of a secondary pilot signal of the first receiver according to the estimated receiving filtering vector and the first spatial channel information; and configured to determine a to-be-sent primary pilot signal according to the transmitting precoding vector of the primary pilot signal and a preset initial primary pilot signal, determine to-be-sent user data of the first receiver according to the transmitting precoding vector of the primary pilot signal and preset user data of the first receiver, and determine to-be-sent secondary pilot signal according to the transmitting precoding vector of the secondary pilot signal and a preset initial secondary pilot signal, where the first spatial channel information is information about spatial channels between the transmitter and the at least two receivers, the second spatial channel information is information about a spatial channel between the transmitter and the first receiver, and the first receiver is any one of the at least two receivers; and a sending unit, configured to send the first receiver the to-be-sent primary pilot signal, the to-be-sent user data of the first receiver, and the to-be-sent secondary pilot signal that are determined by the determining unit.

In a first possible implementation manner of the first aspect, the transmitting precoding vector that is of the secondary pilot signal of the first receiver and that is determined by the determining unit is orthogonal to a third spatial channel, where the third spatial channel is a spatial channel between the transmitter and another receiver in the at least two receivers than the first receiver.

With reference to the first aspect or the first possible implementation manner of the first aspect, in a second possible implementation manner of the first aspect, the primary pilot signal and the secondary pilot signal are orthogonal to each other.

According to a second aspect, an embodiment of the present invention provides a receiver, including:

a receiving unit, configured to receive a secondary pilot signal, a primary pilot signal, and user data; and a determining unit, configured to obtain an equivalent channel estimation value of the secondary pilot signal according to the secondary pilot signal received by the receiving unit and a preset initial secondary pilot signal, and determine an actual receiving filtering vector according to the equivalent channel estimation value of the secondary pilot signal; configured to determine an equivalent channel estimation value of the primary pilot signal according to the primary pilot signal received by the receiving unit, the actual receiving filtering vector, and a preset initial primary pilot signal; and configured to determine user data according to the user data received by the receiving unit and the determined equivalent channel estimation value of the primary pilot signal.

In a first possible implementation manner of the second aspect, the primary pilot signal and the secondary pilot signal are orthogonal to each other.

According to a third aspect, an embodiment of the present invention provides a transmitter, applied in a multi-user multiple-input multiple-output MU MIMO system, where the MU MIMO system includes one transmitter that communicates with at least two receivers, and the transmitter includes:

a processor, configured to determine a transmitting precoding vector of a primary pilot signal of a first receiver according to first spatial channel information, and determine an estimated receiving filtering vector according to the transmitting precoding vector of the primary pilot signal and second spatial channel information; configured to determine a transmitting precoding vector of a secondary pilot signal of the first receiver according to the estimated receiving filtering vector and the first spatial channel information; and configured to determine a to-be-sent primary pilot signal according to the transmitting precoding vector of the primary pilot signal and a preset initial primary pilot signal, determine to-be-sent user data of the first receiver according to the transmitting precoding vector of the primary pilot signal and preset user data of the first receiver, and determine to-be-sent secondary pilot signal according to the transmitting precoding vector of the secondary pilot signal and a preset initial secondary pilot signal, where the first spatial channel information is information about spatial channels between the transmitter and the at least two receivers, the second spatial channel information is information about a spatial channel between the transmitter and the first receiver, and the first receiver is any one of the at least two receivers; and a sender, configured to send the first receiver the to-be-sent primary pilot signal, the to-be-sent user data of the first receiver, and the to-be-sent secondary pilot signal that are determined by the processor.

In a first possible implementation manner of the third aspect, the transmitting precoding vector that is of the secondary pilot signal of the first receiver and that is determined by the processor is orthogonal to a third spatial channel, where the third spatial channel is a spatial channel between the transmitter and another receiver in the at least two receivers than the first receiver.

With reference to the third aspect or the first possible implementation manner of the third aspect, in a second possible implementation manner of the third aspect, the primary pilot signal and the secondary pilot signal are orthogonal to each other.

According to a fourth aspect, an embodiment of the present invention provides a receiver, including:

a receiving device, configured to receive a secondary pilot signal, a primary pilot signal, and user data; and a processor, configured to obtain an equivalent channel estimation value of the secondary pilot signal according to the secondary pilot signal received by the receiving device and a preset initial secondary pilot signal, and determine an actual receiving filtering vector according to the equivalent channel estimation value of the secondary pilot signal; configured to determine an equivalent channel estimation value of the primary pilot signal according to the primary pilot signal received by the receiving device, the actual receiving filtering vector, and a preset initial primary pilot signal; and configured to determine user data according to the user data received by the receiving device and the determined equivalent channel estimation value of the primary pilot signal.

In a first possible implementation manner of the fourth aspect, the primary pilot signal and the secondary pilot signal are orthogonal to each other.

According to a fifth aspect, an embodiment of the present invention provides a method for sending a signal, applied in a multi-user multiple-input multiple-output MU MIMO system, where the MU MIMO system includes one transmitter that communicates with at least two receivers, and the method includes:

determining, by a transmitter, a transmitting precoding vector of a primary pilot signal of a first receiver according to first spatial channel information, and determining an estimated receiving filtering vector according to the transmitting precoding vector of the primary pilot signal and second spatial channel information, where the first spatial channel information is information about spatial channels between the transmitter and the at least two receivers, the second spatial channel information is information about a spatial channel between the transmitter and the first receiver, and the first receiver is any one of the at least two receivers;

determining, by the transmitter, a transmitting precoding vector of a secondary pilot signal of the first receiver according to the estimated receiving filtering vector and the first spatial channel information;

determining, by the transmitter, a to-be-sent primary pilot signal according to the transmitting precoding vector of the primary pilot signal and a preset initial primary pilot signal, determining to-be-sent user data of the first receiver according to the transmitting precoding vector of the primary pilot signal and preset user data of the first receiver, and determining a to-be-sent secondary pilot signal according to the transmitting precoding vector of the secondary pilot signal and a preset initial secondary pilot signal; and sending, by the transmitter to the first receiver, the to-be-sent primary pilot signal, the to-be-sent user data of the first receiver, and the to-be-sent secondary pilot signal.

In a first possible implementation manner of the fifth aspect, the transmitting precoding vector of the secondary pilot signal of the first receiver is orthogonal to a third spatial channel, where the third spatial channel is a spatial channel between the transmitter and another receiver in the at least two receivers than the first receiver.

With reference to the fifth aspect or the first possible implementation manner of the fifth aspect, in a second possible implementation manner of the fifth aspect, the primary pilot signal and the secondary pilot signal are orthogonal to each other.

According to a sixth aspect, an embodiment of the present invention provides a method for receiving a signal, including:

receiving a secondary pilot signal, a primary pilot signal, and user data;

obtaining an equivalent channel estimation value of the secondary pilot signal according to the received secondary pilot signal and a preset initial secondary pilot signal, and determining an actual receiving filtering vector according to the equivalent channel estimation value of the secondary pilot signal;

determining an equivalent channel estimation value of the primary pilot signal according to the received primary pilot signal, the actual receiving filtering vector, and a preset initial primary pilot signal; and determining user data according to the received user data and the determined equivalent channel estimation value of the primary pilot signal.

In a first possible implementation manner of the sixth aspect, the primary pilot signal and the secondary pilot signal are orthogonal to each other.

According to the method and apparatus for sending and receiving a signal that are provided in the embodiments of the present invention, a transmitter determines a transmitting precoding vector of a primary pilot signal and a transmitting precoding vector of a secondary pilot signal; and the transmitter determines a to-be-sent primary pilot signal, to-be-sent user data of a first receiver, and a to-be-sent secondary pilot signal, and sends the first receiver the to-be-sent primary pilot signal, the to-be-sent user data of the first receiver, and the to-be-sent secondary pilot signal, so that the receiver can receive and process the primary and secondary pilot signals sent by the transmitter, and therefore correctly determine user data. In this solution, the transmitter uses a precoding technology, which enables primary pilot signals used by multiple data streams to be spatially orthogonal to each other and secondary pilot signals used by multiple data streams to be also spatially orthogonal to each other; therefore, a quantity of pilots does not increase with increasing paired data streams of an MU-MIMO system, and overheads of the pilots are fixed.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Channel estimation is to keep track of time-domain and frequency-domain changes of a channel by using a pilot signal that is obtained in advance by a transmitter and a receiver. For example, in order to implement channel quality measurement and user data demodulation in a high-order multi-antenna system, two types of pilots are defined for an LTE-A system: a common pilot and a dedicated pilot. The common pilot includes a CRS (Cell-specific public reference signals, cell-specific reference signal) and a CSI-RS (Channel State Information-Reference Signal, channel quality measurement reference symbol). Such a pilot is used to perform channel estimation and user data demodulation for a common channel (such as a broadcast channel or a control channel), and is also used to perform channel estimation and data demodulation for user data transmitted in another mode than TM7, TM8, and TM9. The dedicated pilot includes a DRS (dedicated reference signal). Such a pilot is used to perform user data modulation for a user that uses a TM7, TM8, or TM9 transmission mode. Multiple data streams that use such a pilot occupy a same time-frequency resource, and each dedicated pilot is used to perform channel estimation and user data demodulation for one data stream.

Figure 1:
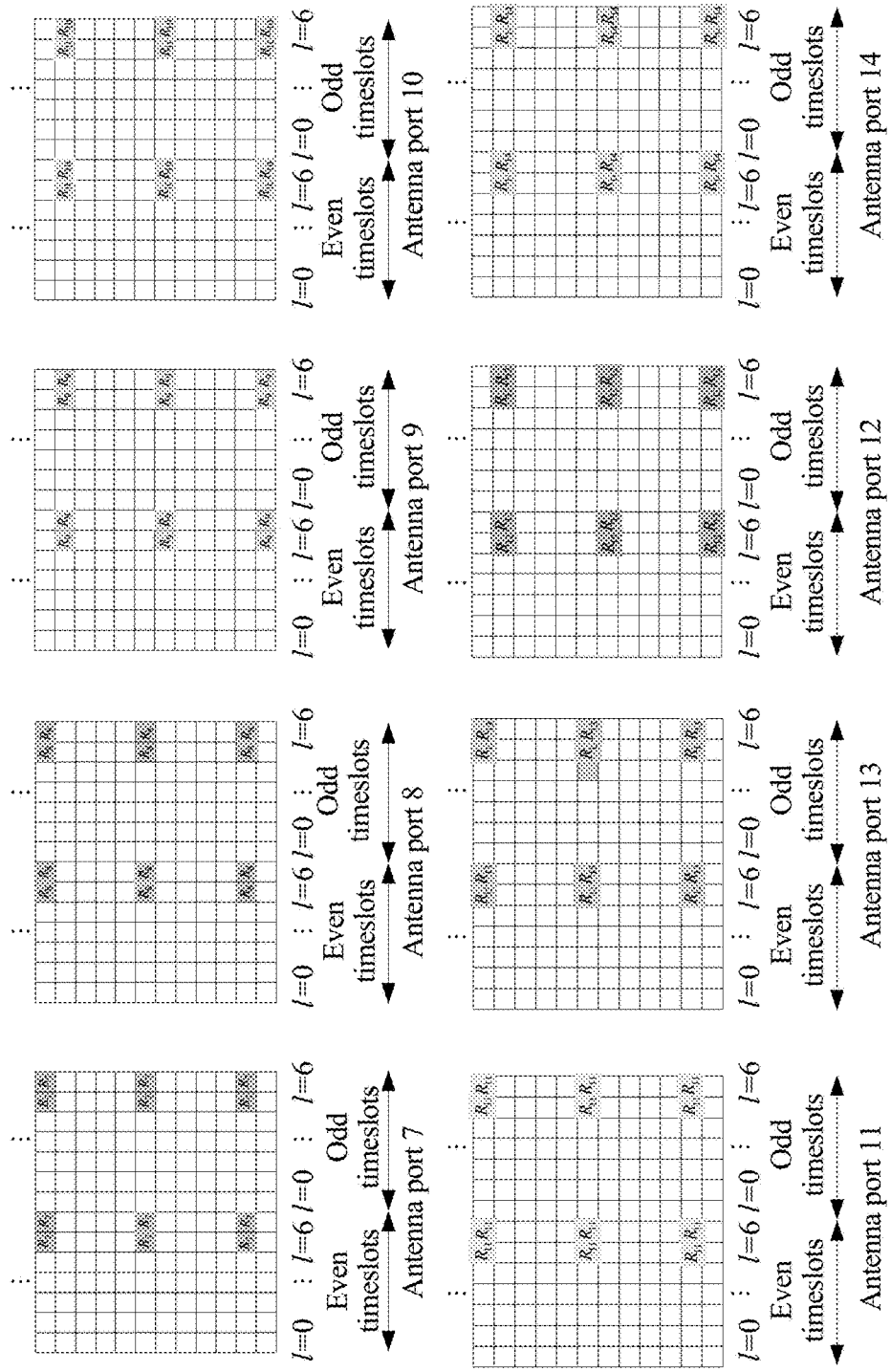
FIG. 1 is a schematic structural diagram of pilot design in the prior art.

Currently, in an LTE (Long Term Evolution) standard, pilots that are used for MU MIMO are designed to be "orthogonal". Multiple pilots are orthogonal to each other in a code division manner or in a code division+frequency division manner. As shown in FIG. 1, in existing pilot design, eight DRS pilots are orthogonal to each other in a code division and frequency division manner. A specific implementation manner is described as below. A first group (Group1) includes pilots 7, 8, 11, and 13, and the four pilots in the Group1 occupy a same time-frequency resource, and are orthogonal to each other in a code division manner. A second group (Group2) includes pilots 9, 10, 12, and 14, and the four pilots in the Group2 occupy a same time-frequency resource, and are orthogonal to each other in a code division manner. The Group1 and the Group2 are orthogonal to each other in a frequency division manner. In this orthogonal pilot design scheme, user data and a pilot use a same transmitting precoding vector.

Specifically, regardless of a pilot design scheme used, a pilot signal received by a receiver may be expressed by using the following formula:

$$y_i = H_i p_i d_i + H_i \sum_{j \neq i} p_j d_j + n_i,$$

where $H_i$ is a frequency-domain spatial channel coefficient matrix between the $i^{th}$ receiver and the transmitter; $p_i$ and $p_j$ are a transmit-end precoding vector of the $i^{th}$ data stream and a transmit-end precoding vector of the $j^{th}$ data stream, respectively; $d_i$ and $d_j$ are a pilot signal corresponding to the $i^{th}$ data stream and a pilot signal corresponding to the $j^{th}$ data stream respectively; and $y_i$ is a pilot signal received by the $i^{th}$ receiver.

In an existing orthogonal pilot design scheme, $d_i$ and $d_j$ are orthogonal to each other, which is irrelevant to a transmitting precoding vector used by a pilot. Regardless of a precoding scheme used, a receiving end can obtain channel information required by the receiving end. Corresponding to the foregoing existing pilot design, a process in which a receiver processes a pilot is described as below.

(1) Based on a received pilot signal, perform channel estimation for a pilot.

In a method for channel estimation, multiple algorithms may be used, including: LS (Least Square, minimum mean square error) estimation, LMMSE (linear minimum mean square error) estimation, IDFT (inverse discrete Fourier transform)+temporal noise reduction, Wiener filtering, Calman filtering, and so on.

(2) Based on an estimated equivalent channel, calculate a receiving filtering vector.

(3) Based on the receiving filtering vector that is obtained by means of calculation in step (2), determine a data channel, and determine data by using the data channel.

However, as paired data streams increase, a quantity of such orthogonal pilots also increase accordingly (a quantity of pilots is equal to a maximum quantity of layers of paired data), and a resulting system overhead may reduce a system gain brought by multi-user MIMO.

The embodiments of the present invention provide a method and apparatus for sending and receiving a signal, where a precoding technology is used to make pilots spatially orthogonal to each other. the method and the apparatus may be used in an MU MIMO system that includes more paired data streams, to achieve that a quantity of pilots does not increase with increasing data streams of the MU-MIMO system, and overheads of the pilots are fixed.

Various technologies described in this specification also apply to data transmission in Massive MIMO and high-order MU MIMO scenarios.

Embodiment 1

Figure 2:
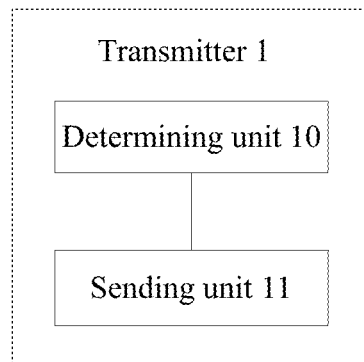
FIG. 2 is a first schematic structural diagram of a transmitter according to an embodiment of the present invention.

An embodiment of the present invention provides a transmitter 1, applied in a multi-user multiple-input multiple-output MU MIMO system, where the MU MIMO system includes one transmitter that communicates with at least two receivers. As shown in FIG. 2, the transmitter 1 includes: a determining unit 10 and a sending unit 11. The determining unit 10 is configured to determine a transmitting precoding vector of a primary pilot signal of a first receiver according to first spatial channel information, and determine an estimated receiving filtering vector according to the transmitting precoding vector of the primary pilot signal and second spatial channel information; configured to determine a transmitting precoding vector of a secondary pilot signal of the first receiver according to the estimated receiving filtering vector and the first spatial channel information; and configured to determine a to-be-sent primary pilot signal according to the transmitting precoding vector of the primary pilot signal and a preset initial primary pilot signal, determine to-be-sent user data of the first receiver according to the transmitting precoding vector of the primary pilot signal and preset user data of the first receiver, and determine to-be-sent secondary pilot signal according to the transmitting precoding vector of the secondary pilot signal and a preset initial secondary pilot signal, where the first spatial channel information is information about spatial channels between the transmitter and the at least two receivers, the second spatial channel information is information about a spatial channel between the transmitter and the first receiver, and the first receiver is any one of the at least two receivers. The sending unit 11 is configured to send the first receiver the to-be-sent primary pilot signal, the to-be-sent user data of the first receiver, and the to-be-sent secondary pilot signal that are determined by the determining unit 10.

It should be noted that, in this embodiment of the present invention, the first receiver is any one of the at least two receivers in the MU MIMO system, which is not limited in this embodiment of the present invention.

The transmitting precoding vector that is of the primary pilot signal and that is determined by the determining unit 10 is not only used to send the primary pilot signal, but also used to send user data. The transmitting precoding vector may be calculated by using any proven precoding algorithm. Optionally, the determining unit 10 may determine the transmitting precoding vector of the primary pilot signal by using a ZF (zero-forcing) algorithm, by using a BD (block diagonalization) algorithm, or by using an RZF (regularized zero-forcing) algorithm or an RBD (regularized block diagonalization) algorithm. It should be noted that this embodiment of the present invention sets no limitation to a specific precoding algorithm used by the determining unit 10.

In addition, the determining unit 10 may determine the estimated receiving filtering vector by using any proven algorithm for a receiver. Exemplarily, algorithms for a receiver include an MRC (maximal ratio combining) algorithm, an MMSE (minimum mean square error) algorithm, and the like.

Further, the transmitting precoding vector that is of the secondary pilot signal of the first receiver and that is determined by the determining unit 10 is orthogonal to a third spatial channel, where the third spatial channel is a spatial channel between the transmitter and another receiver in the at least two receivers than the first receiver.

Further, the primary pilot signal and the secondary pilot signal are orthogonal to each other.

The primary pilot signal and the secondary pilot signal may be orthogonal to each other in a frequency division and/or code division and/or time division manner.

Figure 4:
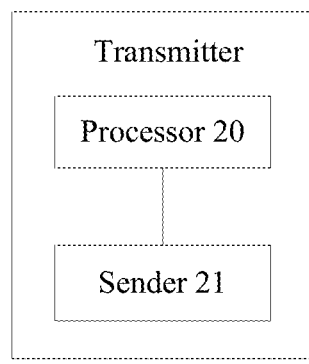
FIG. 4 is a second schematic structural diagram of a transmitter according to an embodiment of the present invention.

It should be noted that the foregoing determining unit 10 may be a processor 20 that is independently disposed in the transmitter, or may be implemented by means of integration to a processor 20 in the transmitter. Correspondingly, the foregoing sending unit 11 may be a sender 21 that is independently disposed in the transmitter, or may be a transceiver in the transmitter. The processor described herein may be a central processing unit (CPU), or may be an application specific integrated circuit (ASIC), or may be one or more integrated circuits that are configured to implement this embodiment of the present invention. Specifically, as shown in FIG. 4, the transmitter provided in this embodiment of the present invention may include a processor 20 and a sender 21, where the processor 20 and the sender 21 are connected to each other and implement mutual communication by using a system bus.

This embodiment of the present invention provides a transmitter, where the transmitter determines a transmitting precoding vector of a primary pilot signal and a transmitting precoding vector of a secondary pilot signal, thereby determining a to-be-sent primary pilot signal, to-be-sent user data of a first receiver, and a to-be-sent secondary pilot signal. Then, the transmitter sends the first receiver the to-be-sent primary pilot signal, the to-be-sent user data of the first receiver, and the to-be-sent secondary pilot signal that are determined by the transmitter, so that the first receiver can receive and process the primary and secondary pilot signals sent by the transmitter, and therefore correctly determine user data. In this solution, the transmitter uses a precoding technology, which enables primary pilot signals used by multiple data streams to be spatially orthogonal to each other and secondary pilot signals used by multiple data streams to be also spatially orthogonal to each other. Therefore, a quantity of pilots does not increase with increasing paired data streams of an MU-MIMO system, and overheads of the pilots are fixed.

Embodiment 2

Figure 3:
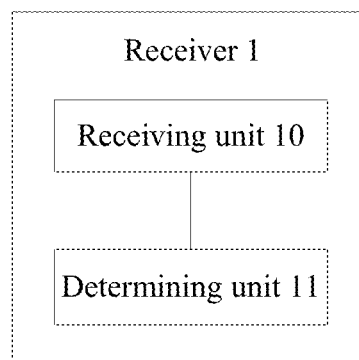
FIG. 3 is a first schematic structural diagram of a receiver according to an embodiment of the present invention.

An embodiment of the present invention provides a receiver 1. As shown in FIG. 3, the receiver 1 includes: a receiving unit 10, and a determining unit 11. The receiving unit 10 is configured to receive a secondary pilot signal, a primary pilot signal, and user data. The determining unit 11 is configured to obtain an equivalent channel estimation value of the secondary pilot signal according to the secondary pilot signal received by the receiving unit 10 and a preset initial secondary pilot signal, and determine an actual receiving filtering vector according to the equivalent channel estimation value of the secondary pilot signal; configured to determine an equivalent channel estimation value of the primary pilot signal according to the primary pilot signal received by the receiving unit 10, the actual receiving filtering vector, and a preset initial primary pilot signal; and configured to determine user data according to the user data received by the receiving unit 10 and the determined equivalent channel estimation value of the primary pilot signal.

Further, the primary pilot signal and the secondary pilot signal are orthogonal to each other.

The primary pilot signal and the secondary pilot signal may be orthogonal to each other in a frequency division and/or code division and/or time division manner.

Figure 5:
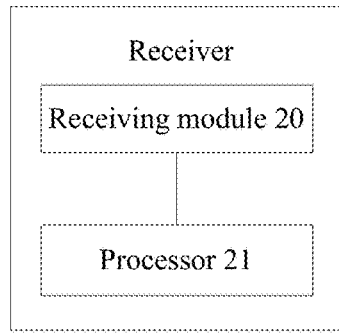
FIG. 5 is a second schematic structural diagram of a receiver according to an embodiment of the present invention.

It should be noted that the foregoing receiving unit 10 may be a receiving device 20 that is independently disposed in the receiver, or may be a transceiver in the receiver. Correspondingly, the foregoing determining unit 11 may be a processor 21 that is independently disposed in the receiver, or may be implemented by means of integration to a processor 21 in the receiver. The processor described herein may be a central processing unit (CPU), or may be an application specific integrated circuit (ASIC), or may be one or more integrated circuits that are configured to implement this embodiment of the present invention. Specifically, as shown in FIG. 5, the receiving device provided in this embodiment of the present invention may include a receiver 20 and a processor 21, where the receiver 20 and the processor 21 are connected to each other by using a system bus, and implement mutual communication by using the system bus.

This embodiment of the present invention provides a receiving device, where after receiving a secondary pilot signal, a primary pilot signal, and user data, the receiving device processes the secondary pilot signal and the primary pilot signal to determine an equivalent channel estimation value of the primary pilot signal; finally, the receiving device correctly determines user data according to the equivalent channel estimation value of the primary pilot signal and the received user data. In this solution, because the primary pilot signals received by the receiving device are spatially orthogonal and the secondary pilot signals received by the receiving device are spatially orthogonal, therefore, a quantity of pilots does not increase with increasing paired data streams of an MU-MIMO system, and overheads of the pilots are fixed.

Embodiment 3

An embodiment of the present invention provides a method for sending a signal, where the method is applied in a multi-user multiple-input multiple-output MU MIMO system.

The MU MIMO system includes one transmitter that communicates with at least two receivers, where the transmitter transmits data streams to the at least two receivers by using a same time-frequency resource, each receiver receives at least one data stream, and at least two spatial channels exist between the transmitter and the at least two receivers. The system includes a primary pilot signal and a secondary pilot signal, where the primary pilot signal and the secondary pilot signal are orthogonal to each other in a frequency division and/or code division and/or time division manner.

Figure 6:
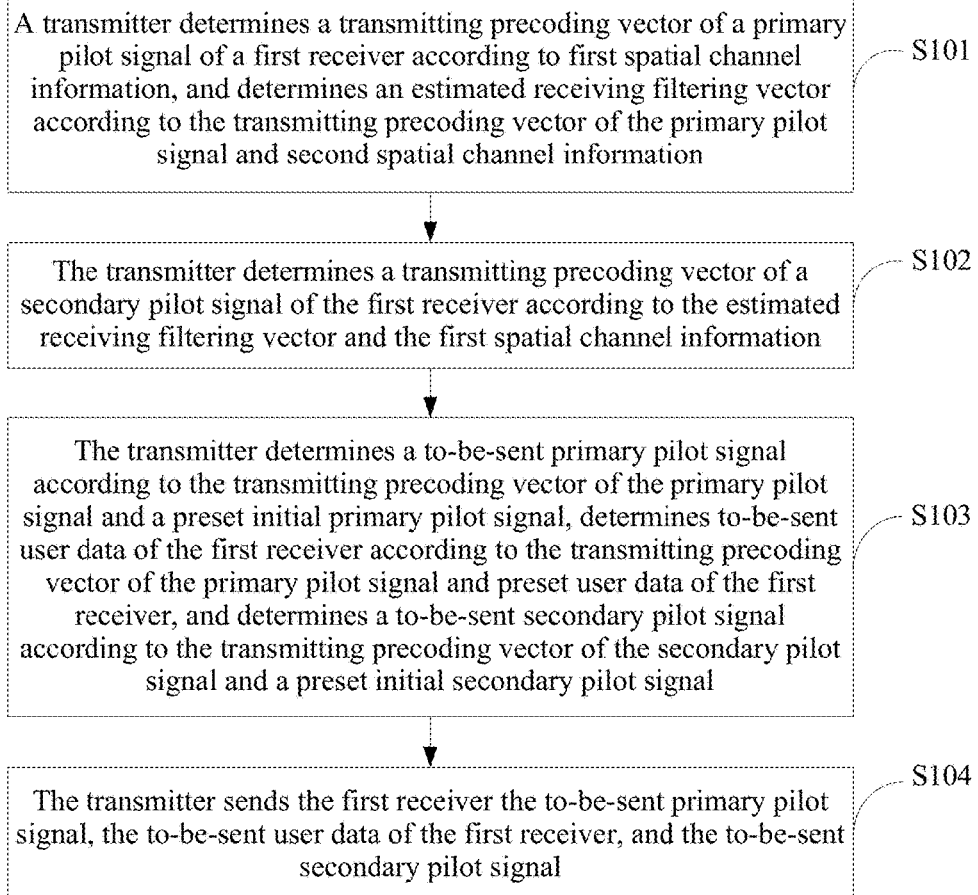
FIG. 6 is a schematic flowchart of a method for sending a pilot signal according to an embodiment of the present invention.

As shown in FIG. 6, the method provided in this embodiment of the present invention includes the following steps:

Step S101. The transmitter determines a transmitting precoding vector of a primary pilot signal of a first receiver according to first spatial channel information, and determines an estimated receiving filtering vector according to the transmitting precoding vector of the primary pilot signal and second spatial channel information.

Step S102. The transmitter determines a transmitting precoding vector of a secondary pilot signal of the first receiver according to the estimated receiving filtering vector and the first spatial channel information.

Step S103. The transmitter determines a to-be-sent primary pilot signal according to the transmitting precoding vector of the primary pilot signal and a preset initial primary pilot signal, determines to-be-sent user data of the first receiver according to the transmitting precoding vector of the primary pilot signal and preset user data of the first receiver, and determines a to-be-sent secondary pilot signal according to the transmitting precoding vector of the secondary pilot signal and a preset initial secondary pilot signal.

Step S104. The transmitter sends the first receiver the to-be-sent primary pilot signal, the to-be-sent user data of the first receiver, and the to-be-sent secondary pilot signal.

The following further describes the technical solution of the present invention with reference to a specific embodiment.

Step S101 is performed, that is, a transmitter determines a transmitting precoding vector of a primary pilot signal of a first receiver according to first spatial channel information, and determines an estimated receiving filtering vector according to the transmitting precoding vector of the primary pilot signal and second spatial channel information. The first spatial channel information is information about a spatial channel between the transmitter and the at least two receivers, and the second spatial channel information is information about a spatial channel between the transmitter and the first receiver.

Specifically, the transmitter determines the transmitting precoding vector of the primary pilot signal of the first receiver according to the information about spatial channels between the transmitter and the at least two receivers.

It should be noted that, in this embodiment of the present invention, the first receiver is any one of the at least two receivers in the MU MIMO system, which is not limited in this embodiment of the present invention.

Specifically, in the MU MIMO system, at least two transmitted data streams exist between the transmitter and the at least two receivers, and the transmitter performs same processing on all transmitted data streams. That is, the transmitter determines, according to the first spatial channel information, a transmitting precoding vector of a primary pilot signal corresponding to each transmitted data stream.

Because the first receiver is any one of all receivers in the MU MIMO system, and the transmitter performs same processing on all the transmitted data streams, that the transmitter determines a transmitting precoding vector of a primary pilot signal of each transmitted data stream corresponding to the first receiver is equivalent to that the transmitter determines a transmitting precoding vector of a primary pilot signal of each transmitted data streams in the system. Therefore, in this embodiment of the present invention, only processing of a transmitted data stream corresponding to the first receiver is used as an example for description.

Specifically, the transmitting precoding vector that is of the primary pilot signal and that is determined by the transmitter is not only used to send the primary pilot signal, but also used to send user data. The transmitting precoding vector may be calculated by using any proven precoding algorithm. Optionally, the transmitter may determine the transmitting precoding vector of the primary pilot signal by using a ZF (Zero-Forcing, zero-forcing) algorithm, by using a BD (block diagonalization) algorithm, or by using an RZF (regularized zero-forcing) algorithm or an RBD (regularized block diagonalization) algorithm.

It should be noted that this embodiment of the present invention sets no limitation to a specific precoding algorithm used by the transmitter.

Further, after determining the transmitting precoding vector of the primary pilot signal of each transmitted data stream, the transmitter determines an estimated receiving filtering vector of each transmitted data stream according to the transmitting precoding vector and the second spatial channel information; then, the transmitter determines a transmitting precoding vector of a secondary pilot signal of each transmitted data stream. It should be noted that the estimated receiving filtering vector is irrelevant to a receiving filtering vector actually used by the first receiver.

In addition, the transmitter may determine the estimated receiving filtering vector by using any proven algorithm for a receiver. Exemplarily, algorithms for a receiver include at least an MRC (maximal ratio combining) algorithm, an MMSE (minimum mean square error) algorithm, and the like.

Step S102 is performed, that is, the transmitter determines a transmitting precoding vector of a secondary pilot signal of the first receiver according to the estimated receiving filtering vector and the first spatial channel information. Specifically, after performing step S101 to determine the estimated receiving filtering vector of each transmitted data stream corresponding to the first receiver, the transmitter determines, according to the estimated receiving filtering vector of each transmitted data stream and the first spatial channel information, the transmitting precoding vector of the secondary pilot signal of each transmitted data stream corresponding to the first receiver.

It should be noted that, in this embodiment of the present invention, when the transmitter determines the transmitting precoding vector of the secondary pilot signal of each transmitted data stream corresponding to the first receiver, a calculation method used by the transmitter needs to ensure that the transmitting precoding vector of the secondary pilot signal of each transmitted data stream in the MU MIMO system is orthogonal to a third spatial channel, where the third spatial channel is a spatial channel between the transmitter and all other receivers in the at least two receivers than a receiver that receives the data stream; that is, a transmitting precoding vector of a secondary pilot signal of any data stream that arrives at the first receiver is orthogonal to the third spatial channel, where the third spatial channel is a spatial channel between the transmitter and all other receivers in the at least two receivers than the first receiver. The technology is expressed by using the following formula:

$$p_i \perp [H_1^H \ldots H_{i-1}^H H_{i+1}^H \ldots H_K^H]^H, \text{ where}$$

K is a quantity of all receivers in the MU MIMO system; $p_i$ is a transmit-end precoding vector of the $i^{th}$ data stream; $H_{i-1}^H$ is a transposed matrix of a frequency-domain spatial channel coefficient matrix between the $(i-1)^{th}$ receiver and the transmitter; $[H_1^H \ldots H_{i-1}^H H_{i+1}^H \ldots H_H^K]^H$ is a transposed matrix of a matrix including transposed matrices of frequency-domain spatial channel coefficient matrices between the transmitter and all other receivers in the MU MIMO system than the $i^{th}$ receiver. That is, the third spatial channel described in the foregoing paragraph; and $p_i \perp [H_1^H \ldots H_{i-1}^H H_{i+1}^H \ldots H_K^H]^H$ indicates that the transmit-end precoding vector of the $i^{th}$ data stream is orthogonal to the third spatial channel.

In this way, $$H_i \sum_{j \neq i} p_j d_j$$

in a pilot signal $$y_i = H_i p_i d_i + H_i \sum_{j \neq i} p_j d_j + n_i$$

received by any receiver is 0. Therefore, it can be ensured that a secondary pilot signal of a data stream arriving at any receiver is free of interference from a secondary pilot signal of another data stream in the system.

Exemplarily, if the MU MIMO system includes one transmitter that communicates with two receivers (a receiver A and a receiver B), the receiver A can receive two data streams, the receiver B can receive three data streams, and a data stream a can be received by the receiver A; then a transmitting precoding vector that is of a secondary pilot signal of the data stream a and that is obtained by the transmitter is orthogonal to a spatial channel of the receiver B.

In addition, a calculation algorithm used by the transmitter to obtain the transmitting precoding vector of the secondary pilot signal may be a ZF algorithm or may be a BD algorithm, which is not limited in this embodiment of the present invention.

Step S103 is performed, that is, the transmitter determines a to-be-sent primary pilot signal according to the transmitting precoding vector of the primary pilot signal and a preset initial primary pilot signal, determines to-be-sent user data of the first receiver according to the transmitting precoding vector of the primary pilot signal and preset user data of the first receiver, and determines a to-be-sent secondary pilot signal according to the transmitting precoding vector of the secondary pilot signal and a preset initial secondary pilot signal. The transmitter multiplies the transmitting precoding vector of the primary pilot signal by the preset initial primary pilot signal to obtain the to-be-sent primary pilot signal, multiplies the transmitting precoding vector of the secondary pilot signal by the preset initial secondary pilot signal to obtain the to-be-sent secondary pilot signal, and multiplies the transmitting precoding vector of the primary pilot signal by the preset user data of the first receiver to obtain the to-be-sent user data of the first receiver.

In this method of the present invention, a transmitting precoding vector of user data of each transmitted data stream is the same as a transmitting precoding vector of a primary pilot signal of the data stream. In addition, in this method of the present invention, all pilot signals that are sent are signals processed by the transmitter according to the transmitting precoding vector, and are spatially orthogonal to each other, which avoids a problem, in design of orthogonal pilots, that a quantity of pilots increases with increasing paired data streams in a system. In this method of the present invention, overheads of the pilots are fixed.

Step S104 is performed, that is, the transmitter sends the first receiver the to-be-sent primary pilot signal, the to-be-sent user data of the first receiver, and the to-be-sent secondary pilot signal. Specifically, the transmitter sends, to a receiver corresponding to all data streams in the system, the to-be-sent primary pilot signal of each transmitted data stream in the system and the to-be-sent secondary pilot signal of each transmitted data stream in the system; that is, after determining the to-be-sent primary pilot signal, the to-be-sent user data of the first receiver, and the to-be-sent secondary pilot signal, the transmitter sends the first receiver the to-be-sent primary pilot signal, the to-be-sent user data of the first receiver, and the to-be-sent secondary pilot signal.

Correspondingly, the first receiver determines, according to the received secondary pilot signal, an actual receiving filtering vector that is used; then, the first receiver determines, according to the actual receiving filtering vector, an equivalent channel through which the primary pilot signal passes; and then the first receiver correctly determines user data according to the equivalent channel of the primary pilot signal.

This embodiment of the present invention provides a method for sending a signal, where the method is applied in a multi-user multiple-input multiple-output MU MIMO system. In this solution, the transmitter uses a precoding technology, which enables primary pilot signals used by multiple data streams to be spatially orthogonal to each other and secondary pilot signals used by multiple data streams to be also spatially orthogonal to each other; therefore, a quantity of pilots does not increase with increasing paired data streams of an MU-MIMO system, and overheads of the pilots are fixed.

Embodiment 4

In an MU MIMO system, spatial multiplexing is implemented for data streams of multiple users by using a precoding technology, and the multiple data streams of pilots occupy a same time-frequency resource, which may greatly improve spectral efficiency and a capacity of the system. However, how to eliminate co-channel interference between users in the MU MIMO system and how to correctly determine user data has become current research subjects.

Currently, in an LTE standard, pilots are designed to be "orthogonal", so that no matter whether interference exists between multiple data streams in the system, a receiver can obtain information about a channel with relatively low inter-user interference and then correctly determine user data. However, in this pilot design, as paired data streams in the system increase, a quantity of required orthogonal pilots also increases accordingly, and an overhead of a pilot is relatively high.

Figure 7:
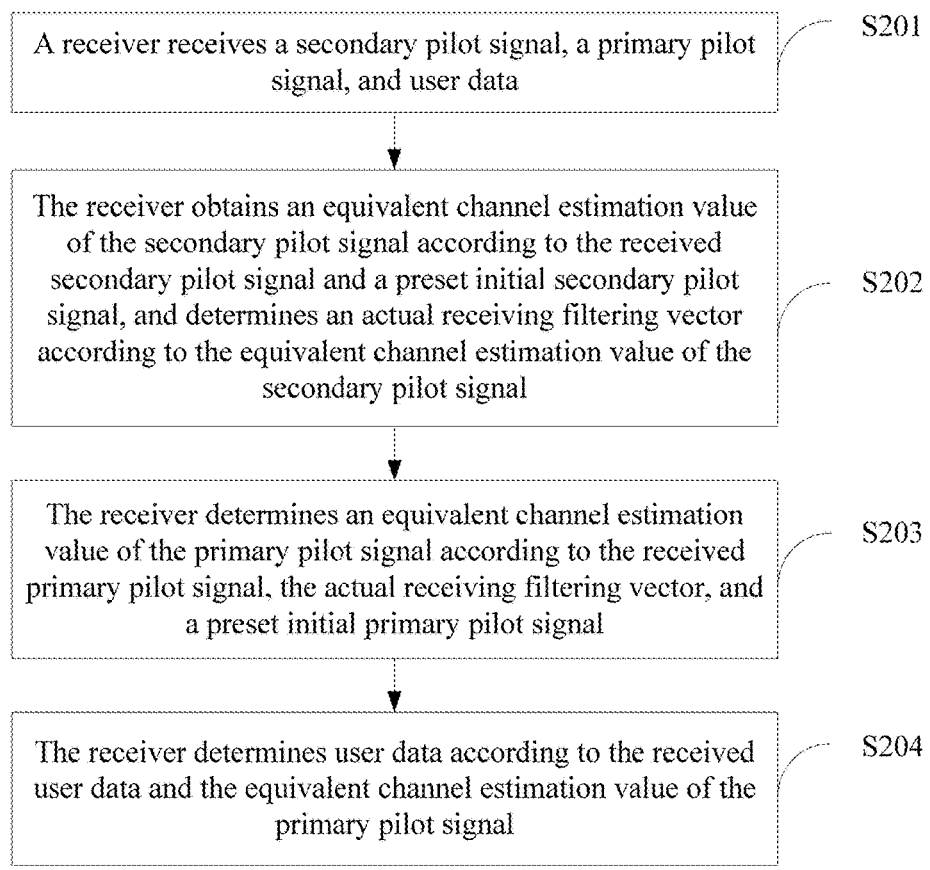
FIG. 7 is a schematic flowchart of a method for receiving a pilot signal according to an embodiment of the present invention.

An embodiment of the present invention provides a method for receiving a signal, which is corresponding to the method for sending a signal in an embodiment of the present invention. As shown in FIG. 7, the method provided in this embodiment of the present invention includes the following steps:

Step S201. A receiver receives a secondary pilot signal, a primary pilot signal, and user data.

Step S202. The receiver obtains an equivalent channel estimation value of the secondary pilot signal according to the received secondary pilot signal and a preset initial secondary pilot signal, and determines an actual receiving filtering vector according to the equivalent channel estimation value of the secondary pilot signal.

Step S203. The receiver determines an equivalent channel estimation value of the primary pilot signal according to the received primary pilot signal, the actual receiving filtering vector, and a preset initial primary pilot signal.

Step S204. The receiver determines user data according to the received user data and the determined equivalent channel estimation value of the primary pilot signal.

The following further describes the technical solution of the present invention with reference to a specific embodiment.

This embodiment of the present invention is also applied in a multi-user multiple-input multiple-output MU MIMO system, where the MU MIMO system includes one transmitter that communicates with at least two receivers, and the transmitter transmits data streams to the at least two receivers by using a same time-frequency resource. Each receiver receives at least one data stream, and at least two spatial channels exist between the transmitter and the at least two receivers. The system includes a primary pilot signal and a secondary pilot signal, where the primary pilot signal and the secondary pilot signal are orthogonal to each other in a frequency division and/or code division and/or time division manner.

Step S201 is performed, that is, a receiver receives a secondary pilot signal, a primary pilot signal, and user data. The secondary pilot signal, the primary pilot signal, and the user data are separately transmitted by the transmitter according to a corresponding transmitting precoding vector. In this embodiment of the present invention, the receiver is any one of the at least two receivers in the system, which is not limited in this embodiment of the present invention.

Specifically, the receiver receives at least one data stream, each data stream has a primary pilot signal and a secondary pilot signal, and the receiver receives the primary pilot signal and the secondary pilot signal that are of each data stream corresponding to the receiver.

It should be noted that the precoding vector that is of the secondary pilot signal and that is used by the transmitter to send the secondary pilot signal of the receiver is orthogonal to spatial channels of all other receivers in the system than a first receiver. In this way, it can be ensured that the secondary pilot signal received by the first receiver is free of interference of a secondary pilot signal of the other receivers in the system.

The system includes at least two receivers, and any one of the receivers performs same processing on all received data streams. Therefore, in this embodiment of the present invention, only one of the receivers is used as an example to describe a process in which a receiver processes one of the received data streams, and details about an operating principle of each receiver in the system are not described again.

Step S202 is performed, that is, the receiver obtains an equivalent channel estimation value of the secondary pilot signal according to the received secondary pilot signal and a preset initial secondary pilot signal, and determines an actual receiving filtering vector according to the equivalent channel estimation value of the secondary pilot signal. A primary pilot signal and a secondary pilot signal exist in the MU MIMO system. After receiving the secondary pilot signal, the primary pilot signal, and the user data, the receiver calculates, according to the secondary pilot signal, a receiving filtering vector that is used in a traffic channel.

Specifically, the receiver obtains the equivalent channel estimation value of the secondary pilot signal according to the received secondary pilot signal and the preset initial secondary pilot signal, and determines the actual receiving filtering vector according to the equivalent channel estimation value of the secondary pilot signal.

The receiver obtains the equivalent channel estimation value of the secondary pilot signal by using any proven channel estimation algorithm according to the received secondary pilot signal and the preset initial secondary pilot signal, which is not limited in this embodiment of the present invention. Optionally, the receiver may obtain an equivalent channel of the secondary pilot signal by means of LS estimation, or by means of LMMSE estimation, or by means of Wiener filtering.

Further, after obtaining the equivalent channel estimation value of the secondary pilot signal, the receiver determines the actual receiving filtering vector according to the equivalent channel estimation value of the secondary pilot signal.

It should be noted that the actual receiving filtering vector herein is a receiving filtering vector that is determined and actually used by the receiver, and the actual receiving filtering vector is only used by the receiver to further determine the equivalent channel estimation value of the primary pilot signal, and is irrelevant to the estimated receiving filtering vector determined by the transmitter in Embodiment 3 of the present invention.

Likewise, a method used by the receiver to determine the actual receiving filtering vector is the same as the method used by the transmitter to determine the estimated receiving filtering vector in Embodiment 3 of the present invention. The receiver may also determine the actual receiving filtering vector by using any proven algorithm for a receiver. Exemplarily, algorithms for a receiver include at least an MRC (Maximal Ratio Combining, maximal ratio combining) algorithm, an MMSE (Minimum Mean Squared Error, minimum mean square error) algorithm, and the like.

Step S203 is performed, that is, the receiver determines an equivalent channel estimation value of the primary pilot signal according to the received primary pilot signal, the actual receiving filtering vector, and a preset initial primary pilot signal. The receiver obtains the equivalent channel estimation value of the primary pilot signal by using any proven channel estimation algorithm according to the received primary pilot signal and the preset initial primary pilot signal, which is not limited in this embodiment of the present invention. Optionally, the receiver may obtain an equivalent channel of the primary pilot signal by means of LS estimation, or by means of LMMSE estimation, or by means of Wiener filtering.

Step S204 is performed, that is, the receiver determines user data according to the received user data and the equivalent channel estimation value that is of the primary pilot signal and that is determined in S203.

This embodiment of the present invention provides a method for receiving a signal, where a receiver receives and processes primary and secondary pilot signals sent by a transmitter, so as to correctly determine user data. In this solution, primary pilot signals used by different data streams are spatially orthogonal to each other, and secondary pilot signals used by different data streams are also spatially orthogonal to each other; therefore, a quantity of pilots does not increase within increasing paired data streams in an MU-MIMO system, and overheads of the pilots are fixed.

Embodiment 5

An embodiment of the present invention provides a method for sending and receiving a signal, where the method is applied in a multi-user multiple-input multiple-output MU MIMO system.

The MU MIMO system includes one transmitter that communicates with at least two receivers, where the transmitter transmits data streams to the at least two receivers by using a same time-frequency resource, each receiver receives at least one data stream, and at least two spatial channels exist between the transmitter and the at least two receivers. The system includes a primary pilot signal and a secondary pilot signal, where the primary pilot signal and the secondary pilot signal are orthogonal to each other in a frequency division and/or code division and/or time division manner.

Figure 8:
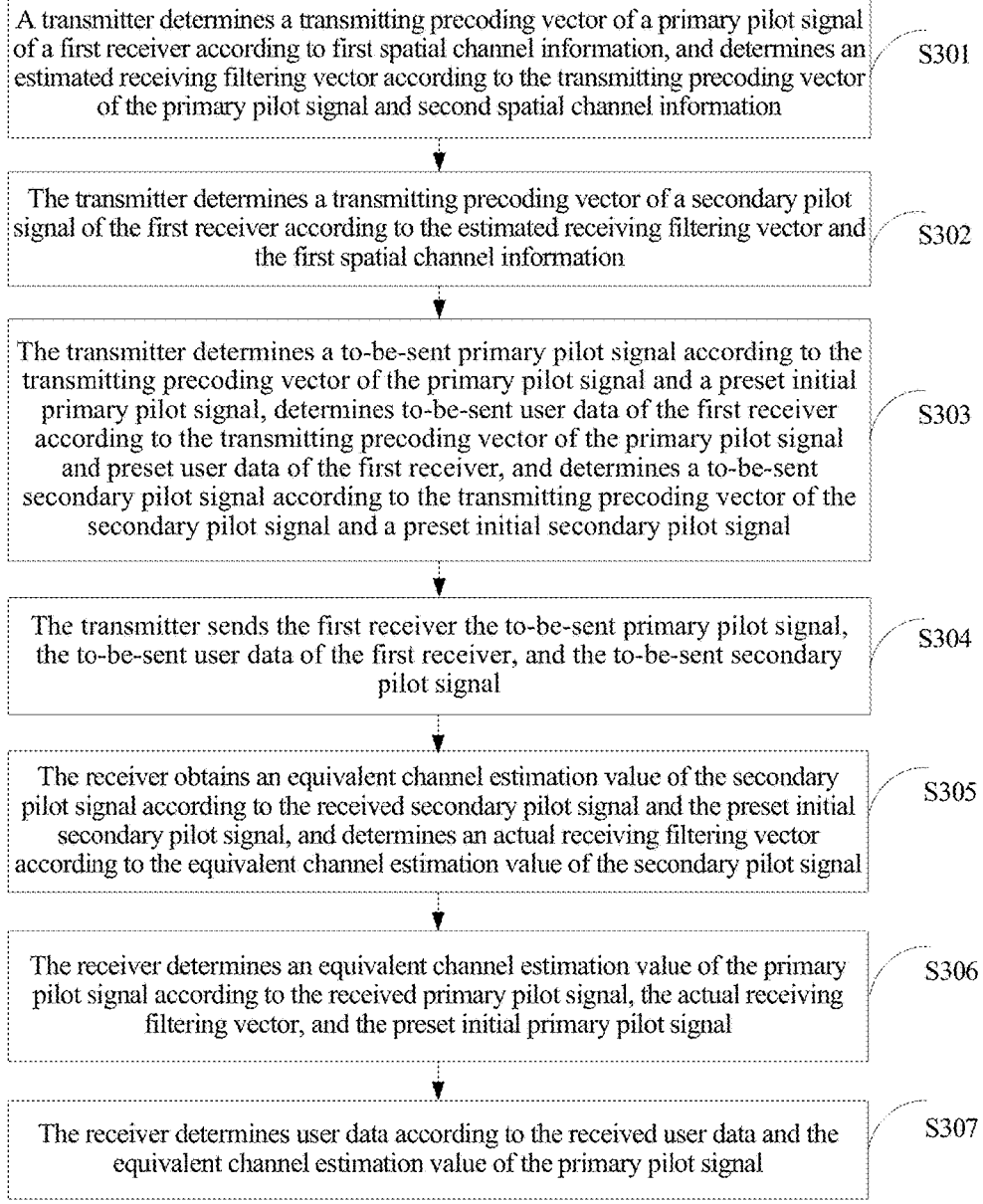
FIG. 8 is a schematic flowchart of a method for sending and receiving a pilot signal according to an embodiment of the present invention.

The system includes at least two receivers, and any one of the receivers performs same processing on all received data streams. Therefore, in this embodiment of the present invention, only a first receiver is used as an example to describe a process in which a receiver processes one of the received data streams, and details about an operating principle of each receiver in the system are not described again. As shown in FIG. 8, the method provided in this embodiment of the present invention includes the following steps:

Step S301. A transmitter determines a transmitting precoding vector of a primary pilot signal of a first receiver according to first spatial channel information, and determines an estimated receiving filtering vector according to the transmitting precoding vector of the primary pilot signal and second spatial channel information.

Step S302. The transmitter determines a transmitting precoding vector of a secondary pilot signal of the first receiver according to the estimated receiving filtering vector and the first spatial channel information.

Step S303. The transmitter determines a to-be-sent primary pilot signal according to the transmitting precoding vector of the primary pilot signal and a preset initial primary pilot signal, determines to-be-sent user data of the first receiver according to the transmitting precoding vector of the primary pilot signal and preset user data of the first receiver, and determines a to-be-sent secondary pilot signal according to the transmitting precoding vector of the secondary pilot signal and a preset initial secondary pilot signal.

Step S304. The transmitter sends the first receiver the to-be-sent primary pilot signal, the to-be-sent user data of the first receiver, and the to-be-sent secondary pilot signal.

Step S305. The first receiver obtains an equivalent channel estimation value of the secondary pilot signal according to the received secondary pilot signal and the preset initial secondary pilot signal, and determines an actual receiving filtering vector according to the equivalent channel estimation value of the secondary pilot signal.

Step S306. The receiver determines an equivalent channel estimation value of the primary pilot signal according to the received primary pilot signal, the actual receiving filtering vector, and the preset initial primary pilot signal.

Step S307. The receiver determines user data according to the received user data and the determined equivalent channel estimation value of the primary pilot signal.

The following further describes the technical solution of the present invention with reference to a specific embodiment.

Step S301 is performed; optionally, the transmitter may determine the transmitting precoding vector of the primary pilot signal by using a ZF algorithm, or by using a BD algorithm, or by using an EZF algorithm or an RBD algorithm.

Exemplarily, if the transmitter determines the transmitting precoding vector of the primary pilot signal by using the EZF algorithm, a calculation method is described as below.

$$[U_i D_i V_i] = svd(H_i)$$

$$H_i^{\mathit{eff}} = (U_i(:,1))^H * H_i$$

$$H = [H_1^{\text{eff}}; H_2^{\text{eff}} \ldots H_k^{\text{eff}}]$$

$$P = H^H (HH^H)^{-1}$$

$$\vec{p}_i^{\,main} = P(:,i)$$

$$\vec{p}_i^{\,main} = \frac{\vec{p}_i^{\,main}}{|\vec{p}_i^{\,main}|},$$

where $H_i$ is a frequency-domain spatial channel coefficient matrix between the $i^{th}$ receiver and the transmitter; svd($H_i$) indicates decomposing the matrix $H_i$; $U_i$ is a left singular matrix of the matrix $H_i$; $U_i(:,1)$ indicates obtaining the $i^{th}$ column of the matrix $U_i$; $(U_i(:,1))^H$ indicates transposing $U_i(:,1)$; $H^H$ is a transposed matrix of a spatial channel coefficient matrix between all receivers and transmitters in the system; $P(:,i)$ indicates obtaining the $i^{th}$ column of a matrix P; and $\vec{p}_i^{\,main}$ indicates obtaining a transmitting precoding vector of a primary pilot of the $i^{th}$ receiver.

Further, after determining a transmitting precoding vector of a primary pilot signal of each transmitted data stream, the transmitter determines an estimated receiving filtering vector of each transmitted data stream according to the transmitting precoding vector and the second spatial channel information; then, the transmitter determines a transmitting precoding vector of a secondary pilot signal of each transmitted data stream.

It should be noted that the estimated receiving filtering vector herein is only used by the transmitter to further determine the transmitting precoding vector of the secondary pilot signal. The estimated receiving filtering vector is irrelevant to a receiving filtering vector actually used by the first receiver.

The transmitter may also determine the estimated receiving filtering vector by using any proven algorithm for a receiver. Exemplarily, algorithms for a receiver include at least an MRC algorithm, an MMSE algorithm, and the like.

Exemplarily, if the transmitter determines the estimated receiving filtering vector by using the MRC algorithm, a calculation method is described as below.

$$w_i = \frac{H_i \cdot \vec{p}_i^{\,main}}{|H_i \cdot \vec{p}_i^{\,main}|},$$

where $w_i$ is an estimated receiving filtering vector of the $i^{th}$ receiver; $H_i$ is a frequency-domain spatial channel coefficient matrix between the $i^{th}$ receiver and the main transmitter, and $\vec{p}_i^{\,main}$ is a transmitting precoding vector of a primary pilot of the $i^{th}$ receiver.

Step S302 is performed, that is, the transmitter determines a transmitting precoding vector of a secondary pilot signal of the first receiver according to the estimated receiving filtering vector and the first spatial channel information. Specifically, after performing step S301 to determine the estimated receiving filtering vector of each transmitted data stream corresponding to the first receiver, the transmitter determines, according to the estimated receiving filtering vector of each transmitted data stream and the first spatial channel information, the transmitting precoding vector of the secondary pilot signal of each transmitted data stream corresponding to the first receiver.

It should be noted that, in this embodiment of the present invention, when the transmitter determines the transmitting precoding vector of the secondary pilot signal of each transmitted data stream corresponding to the first receiver, a calculation method used by the transmitter needs to ensure that the transmitting precoding vector of the secondary pilot signal of each transmitted data stream in the MU MIMO system is orthogonal to a third spatial channel, where the third spatial channel is a spatial channel between the transmitter and all other receivers in the at least two receivers than a receiver that receives the data stream; that is, a transmitting precoding vector of a secondary pilot signal of any data stream that arrives at the first receiver is orthogonal to the third spatial channel, where the third spatial channel is a spatial channel between the transmitter and all other receivers in the at least two receivers than the first receiver. The technology is expressed by using the following formula:

$$p_i \perp [H_1^H \ldots H_{i-1}^H H_{i+1}^H \ldots H_K^H]^H, \text{ where}$$

K is a quantity of all receivers in the MU MIMO system; $p_i$ is a transmit-end precoding vector of the $i^{th}$ data stream; $H_{i-1}^H$ is a transposed matrix of a frequency-domain spatial channel coefficient matrix between the $(i-1)^{th}$ receiver and the transmitter; $[H_1^H \ldots H_{i-1}^H H_{i+1}^H \ldots H_K^H]^H$ is a transposed matrix of a matrix consisting of transposed matrices of frequency-domain spatial channel coefficient matrices between the transmitter and all other receivers in the MU MIMO system than the $i^{th}$ receiver. That is, the third spatial channel described in the foregoing paragraph; and $p_i \perp [H_1^H \ldots H_{i-1}^H H_{i+1}^H \ldots H_K^H]^H$ indicates that the transmit-end precoding vector of the $i^{th}$ data stream is orthogonal to the third spatial channel.

In this way, $$H_i \sum_{j \neq i} p_j d_j$$

in a pilot signal $$y_i = H_i p_i d_i + H_i \sum_{j \neq i} p_j d_j + n_i$$

received by any receiver is 0. Therefore, it can be ensured that a secondary pilot signal of a data stream arriving at any receiver is free of interference from a secondary pilot signal of another data stream in the system.

For example, if the MU MIMO system includes one transmitter and two receivers (a receiver A and a receiver B), the receiver A can receive two data streams, the receiver B can receive three data streams, and a data stream a can be received by the receiver A; then a transmitting precoding vector that is of a secondary pilot signal of the data stream a and that is obtained by the transmitter is orthogonal to a spatial channel of the receiver B.

A calculation algorithm used by the transmitter to obtain the transmitting precoding vector of the secondary pilot signal may be a ZF algorithm or may be a BD algorithm, which is not limited in this embodiment of the present invention.

Exemplarily, if the transmitter obtains the transmitting precoding vector of the secondary pilot signal by using the BD algorithm, a calculation method is described as below.

(1) Calculate a precoding direction $V_{-i}^{(0)}$ that is orthogonal to channels of all other receivers;

$$H_{-i} = [H_1^H \ldots H_{i-1}^H H_{i+1}^H \ldots H_K^H]^H$$

$$H_{-i} = U_{-i} D_{-i} [V_{-i}^{(1)} V_{-i}^{(0)}]^H$$

(2) Calculate $\vec{p}_i^*$, so that:

$$\vec{w}_i = H_i \cdot V_{-i}^{(0)} \cdot \vec{p}_i^*$$

(3) Obtain a transmitting precoding vector $\vec{p}_i^{aux}$ of the secondary pilot signal;

$$\vec{p}_i^{aux} = V_{-i}^{(0)} \cdot \vec{p}_i^*, \text{ where}$$

$H_H^K$ is a transposed matrix of a frequency-domain spatial channel coefficient matrix between the $K^{th}$ receiver and the transmitter; $H_i$ is a frequency-domain spatial channel coefficient matrix between the $i^{th}$ receiver and the aux transmitter; and $\vec{p}_i^{aux}$ is a transmitting precoding vector of a secondary pilot signal of the $i^{th}$ receiver.

Step S303 is performed, that is, after the transmitter determines a transmitting precoding vector of a primary pilot signal of a transmitted data stream and a transmitting precoding vector of a secondary pilot signal of the transmitted data stream, the transmitter separately performs corresponding processing, according to the two transmitting precoding vectors, on a preset initial primary pilot signal, a preset initial secondary pilot signal, and preset user data that is of a first receiver.

Specifically, the transmitter multiplies the transmitting precoding vector of the primary pilot signal by the preset initial primary pilot signal to obtain the to-be-sent primary pilot signal, multiplies the transmitting precoding vector of the secondary pilot signal by the preset initial secondary pilot signal to obtain the to-be-sent secondary pilot signal, and multiplies the transmitting precoding vector of the primary pilot signal by the preset user data of the first receiver to obtain the to-be-sent user data of the first receiver. In this method of the present invention, a transmitting precoding vector of user data of each transmitted data stream is the same as a transmitting precoding vector of a primary pilot signal of the data stream.

Further, the transmitter performs corresponding processing on the preset initial secondary pilot signal by using the following formula:

$$\vec{p}_i^{aux} \cdot DRS^{aux}, \text{ where}$$

$DRS^{aux}$ is the preset initial secondary pilot signal; and $\vec{p}_i^{aux}$ is the transmitting precoding vector of the secondary pilot signal;

the transmitter performs corresponding processing on the preset initial primary pilot signal by using the following formula:

$$\vec{p}_i^{main} \cdot DRS^{main}, \text{ where}$$

$DRS^{main}$ is the preset initial primary pilot signal; and $\vec{p}_i^{aux}$ is the transmitting precoding vector of the primary pilot signal; and the transmitter performs corresponding processing on the preset user data of the first receiver by using the following formula:

$$\vec{p}_i^{main} \cdot \text{data, where}$$

data is the preset user data of the first receiver; and $\vec{p}_i^{aux}$ is the transmitting precoding vector of the primary pilot signal.

It may be understood that after the transmitter processes the preset initial primary pilot signal and the preset initial secondary pilot signal, both the to-be-sent primary pilot signal and the to-be-sent secondary pilot signal are modulated, by the transmitter, onto ideal channels, and are transmitted according to their respective transmitting precoding vectors, and a spatial channel of the secondary pilot signal is orthogonal to spatial channels of all other receivers.

Different from an existing pilot design scheme, in this method of the present invention, all pilot signals that are sent are signals processed by the transmitter according to the transmitting precoding vector, and are spatially orthogonal to each other, which avoids a problem, in design of orthogonal pilots, that a quantity of pilots increases with increasing paired data streams in a system. In this method of the present invention, overheads of the pilots are fixed.

Step S304 is performed, that is, the transmitter sends, to receivers corresponding to all data streams in the system, the to-be-sent primary pilot signal of each transmitted data stream in the system, the to-be-sent secondary pilot signal of each transmitted data stream in the system, and the user data that is of each transmitted data stream; that is, after determining the to-be-sent primary pilot signal, the to-be-sent secondary pilot signal, and the to-be-sent user data of the first receiver, the transmitter sends the first receiver the to-be-sent primary pilot signal, the to-be-sent secondary pilot signal, and the to-be-sent user data of the first receiver.

Correspondingly, after the transmitter sends the first receiver the to-be-sent primary pilot signal, the to-be-sent secondary pilot signal, and the to-be-sent user data of the first receiver, the first receiver determines, according to the received secondary pilot signal, an actual receiving filtering vector that is used. Then, the first receiver determines, according to the actual receiving filtering vector, an equivalent channel through which the primary pilot signal passes. Then, the first receiver correctly demodulates the user data according to the equivalent channel of the primary pilot signal.

It may be found that the transmitter uses a precoding technology, and therefore, pilot signals used by multiple data streams in the system are spatially orthogonal to each other, so that the first receiver can obtain an equivalent channel of a traffic channel and then correctly determine user data.

Step S305 is performed, that is, the first receiver obtains an equivalent channel estimation value of the secondary pilot signal according to the received secondary pilot signal and the preset initial secondary pilot signal, and determines an actual receiving filtering vector according to the equivalent channel estimation value of the secondary pilot signal. A primary pilot signal and a secondary pilot signal exist in the MU MIMO system. After receiving the secondary pilot signal, the primary pilot signal, and the user data, the first receiver may learn, according to the secondary pilot signal, a receiving filtering vector that is used in a traffic channel.

Specifically, the first receiver obtains the equivalent channel estimation value of the secondary pilot signal according to the received secondary pilot signal and the preset initial secondary pilot signal, and determines the actual receiving filtering vector according to the equivalent channel estimation value of the secondary pilot signal.

The first receiver obtains, according to the received secondary pilot signal and the preset initial secondary pilot signal, the equivalent channel estimation value of the secondary pilot signal by using any proven channel estimation algorithm, which is not limited in this embodiment of the present invention. Optionally, the first receiver may obtain the equivalent channel estimation value of the secondary pilot signal by means of LS estimation, or by means of LMMSE estimation, or by means of Wiener filtering.

Exemplarily, the first receiver uses the LMMSE estimation algorithm to obtain the equivalent channel estimation value of the secondary pilot signal according to a received secondary pilot signal and a preset initial secondary pilot signal. The method is described as below.

(1) Estimate an equivalent channel of the secondary pilot signal by using the LS algorithm. An estimated result is described as below.

$$\hat{H}_{LS,i}^{aux} = \frac{y_i^{aux}}{DRS_i^{aux}},$$

where $DRS^{aux}$ is a preset initial secondary pilot signal; $y_i^{aux}$ is a secondary pilot signal received by the $i^{th}$ receiver; and $\tilde{H}_{LS,i}^{aux}$ is an equivalent channel frequency-domain coefficient matrix of the secondary pilot signal of the $i^{th}$ receiver.

(2) Perform filtering, by using the LMMSE algorithm, on the result obtained in step (1).

$$\hat{H}_{LMMSE,i}^{aux} = R_{HH_{DRS}} \cdot \left[ R_{H_{DRS}H_{DRS}} + I\frac{1}{SNR} \right]^{-1} \cdot \hat{H}_{LS,i}^{aux}$$

where $\tilde{H}_{LMMSE,i}^{aux}$ is an equivalent channel frequency-domain coefficient matrix of the secondary pilot signal of the $i^{th}$ receiver after filtering is performed; $R_{HH_{DRS}}$ indicates a cross-correlation matrix of all frequency-domain subcarriers and a subcarrier on which a secondary pilot is located; $R_{H_{DRS}H_{DRS}}$ indicates an auto-correlation matrix of the subcarrier of the secondary pilot; SNR indicates a signal-to-noise ratio; and I indicates an identity matrix.

It should be noted that regardless of an algorithm used by the first receiver to obtain the equivalent channel estimation value of the secondary pilot signal, filtering needs to be performed on the estimated result to eliminate noise interference. Namely, step (2) in the foregoing example needs to be performed, so as to ensure that the equivalent channel estimation value of the secondary pilot signal can be correctly obtained.

Further, after obtaining the equivalent channel estimation value of the secondary pilot signal, the first receiver determines the actual receiving filtering vector according to the equivalent channel estimation value of the secondary pilot signal.

It should be noted that the actual receiving filtering vector herein is a receiving filtering vector that is determined and actually used by the first receiver, and the actual receiving filtering vector is only used by the first receiver to further determine the equivalent channel estimation value of the primary pilot signal, and is irrelevant to the estimated receiving filtering vector determined by the transmitter in this embodiment of the present invention.

Likewise, a method used by the first receiver to determine the actual receiving filtering vector is the same as the method used by the transmitter to determine the estimated receiving filtering vector in this embodiment of the present invention.

The first receiver may also determine the actual receiving filtering vector by using any proven algorithm for a receiver. Algorithms for a receiver include at least an MRC algorithm, an MMSE algorithm, and the like.

Exemplarily, the first receiver uses the MMSE algorithm to determine the actual receiving filtering vector, and the method is described as below.

$$\vec{w}_i = (\tilde{H}_i^{aux}((\tilde{H}_i^{aux})^H \tilde{H}_i^{aux} + \sigma^2 I)^{-1}, \text{ where}$$

$\tilde{H}_i^{aux}$ is an equivalent channel frequency-domain coefficient matrix of a secondary pilot signal of the $i^{th}$ receiver, which is obtained after the $i^{th}$ receiver performs filtering on the equivalent channel estimation value of the secondary pilot signal; $\sigma^2$ is an average noise power; and $\vec{w}_i$ is an actual receiving filtering vector of the $i^{th}$ receiver.

Step S306 is performed, that is, the receiver determines an equivalent channel estimation value of the primary pilot signal according to the received primary pilot signal, the actual receiving filtering vector, and the preset initial primary pilot signal. The first receiver obtains the equivalent channel estimation value of the primary pilot signal by using any proven channel estimation algorithm according to the received primary pilot signal and the preset initial primary pilot signal, which is not limited in this embodiment of the present invention. Optionally, the first receiver may obtain the equivalent channel estimation value of the secondary pilot signal by means of LS estimation, or by means of LMMSE estimation, or by means of Wiener filtering.

Exemplarily, the first receiver uses the LMMSE estimation algorithm to determine, according to an actual receiving filtering vector, a received primary pilot signal, and a preset initial primary pilot signal, an equivalent channel estimation value of the primary pilot signal. The method is described as below.

(1) Estimate an equivalent channel of the primary pilot signal by using the LS algorithm. An estimated result is described as below.

$$\hat{H}_{LS,i}^{main} = \frac{\vec{w}_i^H y_i^{main}}{DRS_I^{main}},$$

where $DRS^{main}$ is a preset initial primary pilot signal; $y_i^{main}$ is a primary pilot signal received by the $i^{th}$ receiver; $\tilde{H}_{LS,i}^{main}$ is an equivalent channel frequency-domain coefficient matrix of the primary pilot signal of the $i^{th}$ receiver; and $\vec{w}_i^H$ indicates transposing an actual receiving filtering vector of the $i^{th}$ receiver.

(2) Perform filtering, by using the LMMSE algorithm, on the result obtained in step (1).

$$\hat{H}_{LMMSE,i}^{main} = R_{HH_{DRS}} \cdot \left[ R_{H_{DRS}H_{DRS}} + I\frac{1}{SNR} \right]^{-1} \cdot \hat{H}_{LS,i}^{main},$$

where $R_{HH_{DRS}}$ indicates a cross-correlation matrix of all frequency-domain subcarriers and a subcarrier on which a primary pilot is located; $R_{H_{DRS}H_{DRS}}$ indicates an auto-correlation matrix of the subcarrier of the primary pilots; SNR indicates a signal-to-noise ratio; and I indicates an identity matrix.

It should be noted that regardless of an algorithm used by the first receiver to obtain the equivalent channel estimation value of the primary pilot signal, filtering needs to be performed on the estimated result to eliminate noise interference. Namely, step (2) in the foregoing example needs to be performed, so as to ensure that the equivalent channel estimation value of the primary pilot signal can be correctly obtained.

Step S307: the receiver determines user data according to the received user data and the equivalent channel estimation value that is of the primary pilot signal and that is determined in step S306. Specifically, the first receiver determines the equivalent channel estimation value of the primary pilot signal. Namely, the first receiver obtains a traffic channel estimation value. After the first receiver determines the equivalent channel estimation value of the primary pilot signal, the first receiver modulates the user data according to the received user data and the equivalent channel estimation value of the primary pilot signal.

Further, the first receiver determines the user data by using the following formula:

$$\hat{x}_i^{data} = \frac{y_i^{data}}{\tilde{H}_i^{main}},$$

where $\hat{x}_i^{data}$ is user data determined by the $i^{th}$ receiver; $y_i^{data}$ is user data received by the $i^{th}$ receiver; and $\tilde{H}_i^{main}$ is an equivalent channel estimation value that is of the primary pilot signal and that is determined by the $i^{th}$ receiver, which is obtained after the $i^{th}$ receiver performs filtering on the equivalent channel estimation value of the primary pilot signal.

This embodiment of the present invention provides a method for sending and receiving a signal, where because a transmitter uses a precoding technology, primary pilot signals used by the multiple data streams are spatially orthogonal to each other; and a receiver receives and processes primary and secondary pilot signals sent by the transmitter, so as to correctly determine user data. In this solution, primary pilot signals used by different data streams are spatially orthogonal to each other, and secondary pilot signals used by different data streams are also spatially orthogonal to each other; therefore, a quantity of pilots does not increase within increasing paired data streams in an MU-MIMO system, and overheads of the pilots are fixed.

It may be clearly understood by a person skilled in the art that, for the purpose of convenient and brief description, division of the foregoing function modules is taken as an example for illustration. In actual application, the foregoing functions can be allocated to different function modules and implemented according to a requirement. Namely, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmitter, applied in a multi-user multiple-input multiple-output (MU MIMO system), wherein the MU MIMO system comprises the transmitter that communicates with at least two receivers, and the transmitter comprises:
at least one processor coupled to a non-transitory computer-readable storage medium that stores programming instructions for execution by the at least one processor, wherein the programming instructions instruct the at least one processor to:
determine a transmitting precoding vector of a primary pilot signal of a first receiver according to first spatial channel information, and determine an estimated receiving filtering vector according to the transmitting precoding vector of the primary pilot signal and second spatial channel information;
determine a transmitting precoding vector of a secondary pilot signal of the first receiver according to the estimated receiving filtering vector and the first spatial channel information; and determine a to-be-sent primary pilot signal according to the transmitting precoding vector of the primary pilot signal and a preset initial primary pilot signal, determine to-be-sent user data of the first receiver according to the transmitting precoding vector of the primary pilot signal and preset user data of the first receiver, and determine to-be-sent secondary pilot signal according to the transmitting precoding vector of the secondary pilot signal and a preset initial secondary pilot signal, wherein the first spatial channel information is information about spatial channels between the transmitter and the at least two receivers, the second spatial channel information is information about a spatial channel between the transmitter and the first receiver, and the first receiver is any one of the at least two receivers; and send the first receiver the to-be-sent primary pilot signal, the to-be-sent user data of the first receiver, and the to-be-sent secondary pilot signal.

2. The transmitter according to claim 1, wherein:
the transmitting precoding vector that is of the secondary pilot signal of the first receiver and that is orthogonal to a third spatial channel, wherein the third spatial channel is a spatial channel between the transmitter and another receiver in the at least two receivers than the first receiver.

3. The transmitter according to claim 2, wherein:
the primary pilot signal and the secondary pilot signal are orthogonal to each other.

4. The transmitter according to claim 1, wherein:
the primary pilot signal and the secondary pilot signal are orthogonal to each other.

5. The transmitter according to claim 1, wherein:
the estimated receiving filtering vector is different from a receiving filtering vector actually used by the first receiver.

6. A receiver, comprising:
at least one processor coupled to a non-transitory computer-readable storage medium that stores programming instructions for execution by the at least one processor, wherein the programming instructions instruct the at least one processor to:
receive a secondary pilot signal, a primary pilot signal, and user data, wherein:
 the primary pilot signal is determined according to a transmitting precoding vector of a primary pilot signal, wherein the transmitting precoding vector of the primary pilot signal is determined according to first spatial channel information;
 the secondary pilot signal is determined according to a transmitting precoding vector of a secondary pilot signal, wherein the transmitting precoding vector of the secondary pilot signal is determined according to an estimated receiving filtering vector and the first spatial channel information, and the estimated receiving filtering vector is determined according to the transmitting precoding vector of the primary pilot signal and second spatial channel information; and
 the user data is determined according to the transmitting precoding vector of the primary pilot signal; and
obtain an equivalent channel estimation value of the secondary pilot signal according to the secondary pilot signal and a preset initial secondary pilot signal, and determine an actual receiving filtering vector according to the equivalent channel estimation value of the secondary pilot signal;

determine an equivalent channel estimation value of the primary pilot signal according to the primary pilot signal, the actual receiving filtering vector, and a preset initial primary pilot signal; and
determine user data according to the user data and the determined equivalent channel estimation value of the primary pilot signal.

7. The receiver according to claim 6, wherein:
the primary pilot signal and the secondary pilot signal are orthogonal to each other.

8. A transmitter, applied in a multi-user multiple-input multiple-output (MU MIMO) system, wherein the MU MIMO system comprises the transmitter that communicates with at least two receivers, and the transmitter comprises:
at least one processor coupled to a non-transitory computer-readable storage medium that stores programming instructions for execution by the at least one processor, wherein the programming instructions instruct the at least one processor to:
determine a transmitting precoding vector of a primary pilot signal of a first receiver according to first spatial channel information, and determine an estimated receiving filtering vector according to the transmitting precoding vector of the primary pilot signal and second spatial channel information;
determine a transmitting precoding vector of a secondary pilot signal of the first receiver according to the estimated receiving filtering vector and the first spatial channel information; and
determine a to-be-sent primary pilot signal according to the transmitting precoding vector of the primary pilot signal and a preset initial primary pilot signal, determine to-be-sent user data of the first receiver according to the transmitting precoding vector of the primary pilot signal and preset user data of the first receiver, and determine to-be-sent secondary pilot signal according to the transmitting precoding vector of the secondary pilot signal and a preset initial secondary pilot signal, wherein the first spatial channel information is information about spatial channels between the transmitter and the at least two receivers, the second spatial channel information is information about a spatial channel between the transmitter and the first receiver, and the first receiver is any one of the at least two receivers; and
send the first receiver the to-be-sent primary pilot signal, the to-be-sent user data of the first receiver, and the to-be-sent secondary pilot signal that are determined by the processor.

9. The transmitter according to claim 8, wherein:
the transmitting precoding vector that is of the secondary pilot signal of the first receiver and that is orthogonal to a third spatial channel, wherein the third spatial channel is a spatial channel between the transmitter and another receiver in the at least two receivers than the first receiver.

10. The transmitter according to claim 9, wherein:
the primary pilot signal and the secondary pilot signal are orthogonal to each other.

11. The transmitter according to claim 8, wherein:
the primary pilot signal and the secondary pilot signal are orthogonal to each other.

12. A receiving device, comprising:
at least one processor; and
a non-transitory computer-readable storage medium coupled to the at least one processor and storing programming instructions for execution by the at least one processor, wherein the programming instructions instruct the at least one processor to:

receive a secondary pilot signal, a primary pilot signal, and user data, wherein:
- the primary pilot signal is determined according to a transmitting precoding vector of a primary pilot signal, wherein the transmitting precoding vector of the primary pilot signal is determined according to first spatial channel information;
- the secondary pilot signal is determined according to a transmitting precoding vector of a secondary pilot signal, wherein the transmitting precoding vector of the secondary pilot signal is determined according to an estimated receiving filtering vector and the first spatial channel information, and the estimated receiving filtering vector is determined according to the transmitting precoding vector of the primary pilot signal and second spatial channel information; and
- the user data is determined according to the transmitting precoding vector of the primary pilot signal;

obtain an equivalent channel estimation value of the secondary pilot signal according to the secondary pilot signal received by the receiving device and a preset initial secondary pilot signal, and determine an actual receiving filtering vector according to the equivalent channel estimation value of the secondary pilot signal;

determine an equivalent channel estimation value of the primary pilot signal according to the primary pilot signal received by the receiving device, the actual receiving filtering vector, and a preset initial primary pilot signal; and determine user data according to the user data received by the receiving device and the determined equivalent channel estimation value of the primary pilot signal.

13. The receiving device according to claim 12, wherein: the primary pilot signal and the secondary pilot signal are orthogonal to each other.

14. The receiving device according to claim 12, wherein: the actual receiving filtering vector is different from the estimated receiving filtering vector.

15. A method for sending a signal, applied in a multi-user multiple-input multiple-output (MU MIMO) system, wherein the MU MIMO system comprises one transmitter that communicates with at least two receivers, and the method comprises:
- determining, by a transmitter, a transmitting precoding vector of a primary pilot signal of a first receiver according to first spatial channel information, and determining, an estimated receiving filtering vector according to the transmitting precoding vector of the primary pilot signal and second spatial channel information, wherein the first spatial channel information is information about spatial channels between the transmitter and the at least two receivers, the second spatial channel information is information about a spatial channel between the transmitter and the first receiver, and the first receiver is any one of the at least two receivers;
- determining, by the transmitter, a transmitting precoding vector of a secondary pilot signal of the first receiver according to the estimated receiving filtering vector and the first spatial channel information;
- determining, by the transmitter, a to-be-sent primary pilot signal according to the transmitting precoding vector of the primary pilot signal and a preset initial primary pilot signal, determining to-be-sent user data of the first receiver according to the transmitting precoding vector of the primary pilot signal and preset user data of the first receiver, and determining a to-be-sent secondary pilot signal according to the transmitting precoding vector of the secondary pilot signal and a preset initial secondary pilot signal; and
- sending, by the transmitter to the first receiver, the to-be-sent primary pilot signal, the to-be-sent user data of the first receiver, and the to-be-sent secondary pilot signal.

16. The method according to claim 15, wherein:
the transmitting precoding vector of the secondary pilot signal of the first receiver is orthogonal to a third spatial channel, wherein the third spatial channel is a spatial channel between the transmitter and another receiver in the at least two receivers than the first receiver.

17. The method according to claim 16, wherein:
the primary pilot signal and the secondary pilot signal are orthogonal to each other.

18. The method according to claim 15, wherein:
the primary pilot signal and the secondary pilot signal are orthogonal to each other.

19. A method for receiving a signal, comprising:
receiving, by a receiver, a secondary pilot signal, a primary pilot signal, and user data, wherein:
- the primary pilot signal is determined according to a transmitting precoding vector of a primary pilot signal, wherein the transmitting precoding vector of the primary pilot signal is determined according to first spatial channel information;
- the secondary pilot signal is determined according to a transmitting precoding vector of a secondary pilot signal, wherein the transmitting precoding vector of the secondary pilot signal is determined according to an estimated receiving filtering vector and the first spatial channel information, and the estimated receiving filtering vector is determined according to the transmitting precoding vector of the primary pilot signal and second spatial channel information; and
- the user data is determined according to the transmitting precoding vector of the primary pilot signal;

obtaining, by the receiver, an equivalent channel estimation value of the secondary pilot signal according to the received secondary pilot signal and a preset initial secondary pilot signal, and determining an actual receiving filtering vector according to the equivalent channel estimation value of the secondary pilot signal;

determining, by the receiver, an equivalent channel estimation value of the primary pilot signal according to the received primary pilot signal, the actual receiving filtering vector, and a preset initial primary pilot signal; and determining, by the receiver, user data according to the received user data and the determined equivalent channel estimation value of the primary pilot signal.

20. The method according to claim 19, wherein:
the primary pilot signal and the secondary pilot signal are orthogonal to each other.

* * * * *